(12) United States Patent
Manna et al.

(10) Patent No.: US 8,600,458 B2
(45) Date of Patent: Dec. 3, 2013

(54) METHOD OF REDUCING POWER CONSUMPTION IN A UE WHEN THE UE IS IN IDLE MODE

(75) Inventors: Avijit Manna, Bangalore (IN); Kirti Keshav, Bangalore (IN); Seshagiri Rao Gorantla, Bangalore (IN)

(73) Assignee: Samsung Electronics Co., Ltd (KR)

( * ) Notice: Subject to any disclaimer, the term of this patent is extended or adjusted under 35 U.S.C. 154(b) by 1334 days.

(21) Appl. No.: 12/187,066

(22) Filed: Aug. 6, 2008

(65) Prior Publication Data

US 2008/0318643 A1 Dec. 25, 2008

(30) Foreign Application Priority Data

Jun. 8, 2007 (IN) ............................ 1726/CHE/2007

(51) Int. Cl.
*H04B 1/38* (2006.01)
(52) U.S. Cl.
USPC ........... 455/574; 455/436; 455/437; 455/438; 455/439; 455/440
(58) Field of Classification Search
USPC ............................ 455/436–444, 343.2–343.5
See application file for complete search history.

(56) References Cited

U.S. PATENT DOCUMENTS

| 6,067,460 | A | 5/2000 | Alanara et al. |
| 6,331,971 | B1 | 12/2001 | Raith |
| 2001/0031638 | A1 * | 10/2001 | Korpela et al. ............... 455/449 |
| 2004/0043798 | A1 * | 3/2004 | Amerga et al. ............... 455/574 |
| 2006/0058033 | A1 | 3/2006 | Marsan et al. |
| 2006/0094452 | A1 * | 5/2006 | Kang ............................ 455/464 |
| 2007/0117566 | A1 | 5/2007 | Khawand et al. |
| 2007/0123265 | A1 | 5/2007 | Moon |

FOREIGN PATENT DOCUMENTS

WO WO 2004/021731 3/2004

OTHER PUBLICATIONS

3rd Generation Partnership Project; Technical Specification Group Radio Access Network; User Equipmenet (UE) Procedures in Idle Mode and Procedures for Cell Reslection in Connected Mode (Rekease 6), 3GPP TS 25.304 V6.9.0, Mar. 1, 2006.
3rd Generation Partnership Project; Technical Specification Group Radio Access Network; Radio Resource Control (RRC); Protocol Specification (Release 6), 3GPP TS 25.331 V6.10.0, Jun. 1, 2006.

* cited by examiner

*Primary Examiner* — Fayyaz Alam
(74) *Attorney, Agent, or Firm* — The Farrell Law Firm, P.C.

(57) ABSTRACT

A method is described for determining the rate of performing neighbor cell measurements by a User Equipment (UE) in an idle mode, which is based on the RANK information of the serving cell and neighbor cells. The RANK information is available with the UE. Comparison of the RANK of the serving cell with a predefined Threshold Value along with the status of the Order of the RANKs of the neighbor cells for a predefined number of DRX cycles, are verified to conclude whether the UE should perform the neighbor cell measurement when the UE is in the idle mode. Thus the method utilizes cell RANKs to determine the network topology. The RANKs are deduced using Hysteresis, Cell Individual offsets, and other parameters by the UE to provide a more practical indication of the neighboring environment of a cell.

9 Claims, 3 Drawing Sheets

METHOD OF REDUCING POWER CONSUMPTION IN A UE WHEN THE UE IS IN IDLE MODE

PRIORITY

This application priority under 35 U.S.C. §119(a) to an application entitled "A METHOD OF REDUCING POWER CONSUMPTION IN A UE WHEN THE UE IS IN IDLE MODE" filed in the Indian Patent Office on Aug. 6, 2007 and assigned Serial No. 1726/CHE/2007, the contents of which are incorporated herein by reference.

BACKGROUND OF THE INVENTION

1. Field of the Invention

The present invention relates generally to power consumption in a User Equipment (UE) in a mobile communication network, and more particularly, to reduction of power consumption in a UE of 2G, 2.5G or 3G mobile communication network when the UE is in an idle mode.

2. Description of the Related Art

As per Global System for Mobile communication (GSM) specifications, once a UE is in an idle mode and the UE has received a neighbor cell list, the UE performs neighbor cell measurements at a periodic rate irrespective of prevalent network conditions. This activity leads to higher power consumption in the UE.

Attempts at resolving this unnecessary power consumption issue have been addressed in 3G system (UMTS), where the UE performs measurements only when the UE is in a poor signal area (defined by the usage of S_intrasrch, S_intersrch and S_srchRAT). Further efforts to address this power consumption issue are found in U.S. Pat. No. 6,331,971, where the UE or other remote units are able to sleep for a longer period of time, thus extending the battery life of the UE, by optimizing the periodicity at which the UE measures control channels on a neighbor cell list to determine whether a new control channel should replace the serving control channel. This requires modification of a paging frame class, which has been assigned to a UE. The UE can then monitor the paging channel at intervals making it more battery conservative for the UE because it is based on current communication conditions.

U.S. Pat. No. 6,067,460 proposes a method of optimizing power consumption by avoiding measurement of the neighbor cells when a UE is stationary or moving slightly with respect to the serving cell and with respect to the neighbor cells, until it determines that it is no longer stationary. The stationary condition of the UE is deduced using measured Received Signal Strength Indication (RSSI) values of the serving cell and neighbor cells.

Thus, efforts have been made to optimize the power consumption in the UE of a 3G system when the UE is in the idle mode, however a need still remains for the reduction of power consumption in the UE when the UE is in the idle mode. The stationary/non-stationary condition of the UE, which is determined using a change in absolute value/rate of change of signal strength of a serving cell and neighbor cells is insufficient for determining suitability for avoiding neighbor cell measurements.

SUMMARY OF THE INVENTION

The present invention has been made to address at least the above problems and/or disadvantages and to provide at least the advantages described below. Accordingly an aspect of the present invention provides a method for reducing power consumption in a UE while it is in an idle mode.

According to one aspect of the present invention, a method is provided for performing neighbor cell measurements at variable intervals in the idle mode instead of continuously measuring them even when the UE is in a strong signal area. The rate of performing neighbor cell measurement is determined by the UE in an idle mode, which is based on the RANK information of the serving cell and neighbor cells. The RANK information is available with the UE. This status of Order of the RANKs of the neighbor cells for a predefined number of Discontinuous Reception (DRX) cycles, is verified to conclude whether the UE should perform the neighbor cell measurement when the UE is in the idle mode. Thus, the method utilizes cell RANKs to determine the network topology. The RANKs being deduced using various Hysteresis, Cell Individual offsets, and other parameters by the UE give a more practical indication of the neighboring environment of a cell.

BRIEF DESCRIPTION OF THE ACCOMPANYING DRAWINGS

The above and other features, aspects, and advantages of the present invention will be more apparent from the following detailed description when taken in conjunction with the accompanying drawings, in which.

DETAILED DESCRIPTION OF THE PREFERRED EMBODIMENTS

Preferred embodiments of the present invention are described below in detail with reference to the accompanying drawings. Detailed descriptions of constructions or processes known in the art may be omitted to avoid obscuring the subject matter of the present invention.

Figure 1:
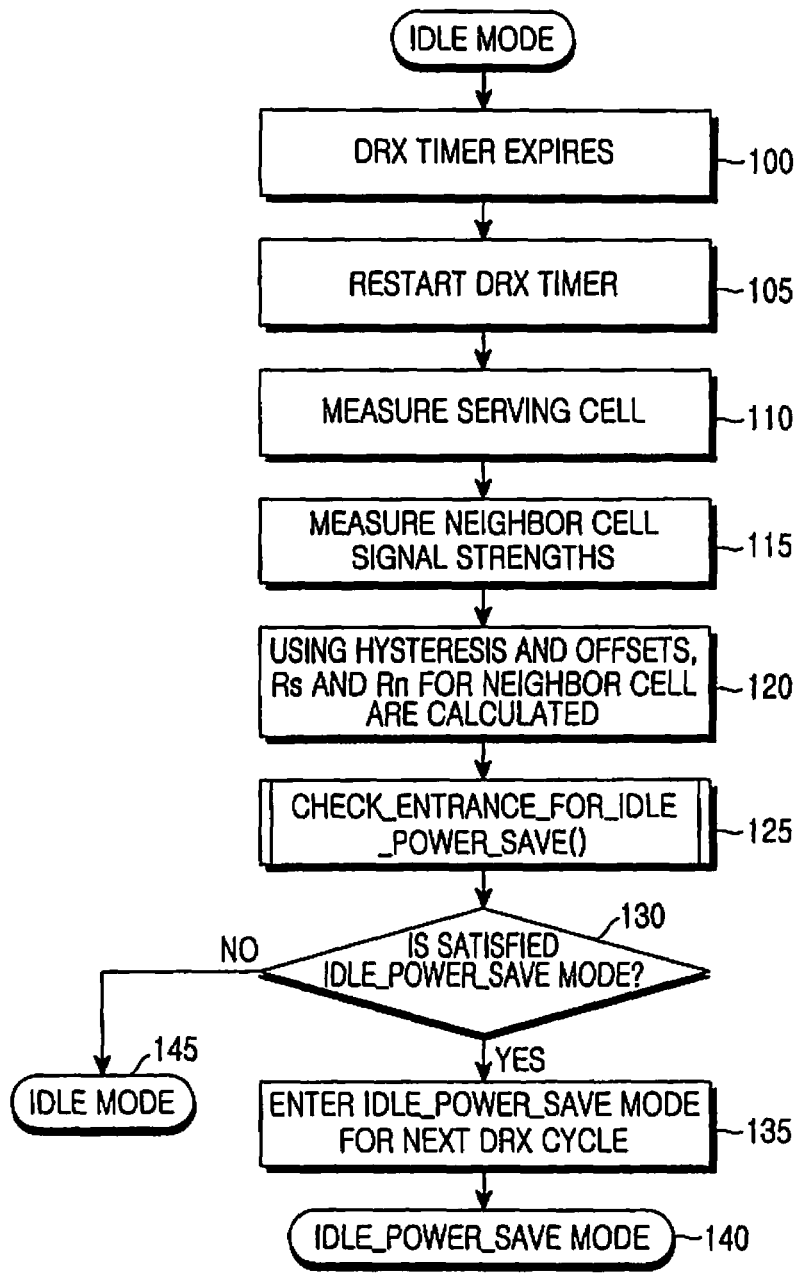
FIG. 1 is a flow diagram illustrating the UE operation in the idle mode including the state of Idle_Power_Save according to an embodiment of the present invention.

FIG. 1 illustrates UE operation in accordance with the present invention when the UE is in an idle mode. The UE in the idle mode, which is a condition of the UE in which discontinuous reception (hereinafter, referred to as DRX) operation proceeds, restarts the DRX timer in step 105 when the DRX timer expires in step 100, and re-enters the DRX cycle. The UE then measures the signal intensity of the serving cell and neighbor cells in steps 110 and 115. In step 120, serving cell RANK ($R_s$) and neighboring cells RANKs ($R_n$) are deduced by the UE using Hysteresis, Individual Cell Offsets, RSSI and other parameters, which are already available with the UE. The state of the UE (in its idle mode), when abstaining from its usual neighbor cell measurements, is defined as an Idle_Power_Save state. Once the RANKs are determined by the UE, the UE checks the above-mentioned conditions to determine whether it can go into the Idle_Power_Save state. More particularly, in step 125, a procedure is conducted to determine when the UE must stop the neighboring cell measurement in step 125, which is defined as 'Check_Entrance_for_Idle_Power_Save( )'. Then, the UE determines if the checked condition satisfies the Idle Power Save state in step 130. More particularly, if the state is satisfied, the UE enters into the Idle_Power_Save mode in the next DRX cycle in step 135, and conducts the Idle Power Save mode in step 140. If not, the UE goes back into its usual idle mode in step 145 and performs the functions as per the normal procedure.

Figure 2:
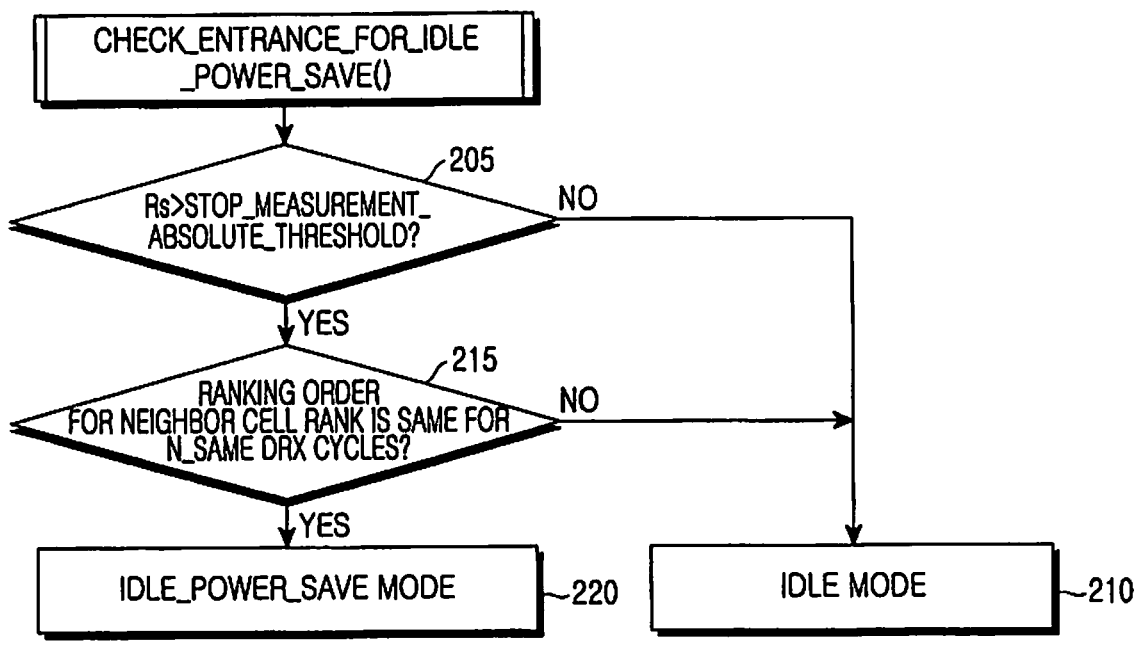
FIG. 2 is a flow diagram illustrating the steps performed by the UE in the idle mode to determine the criteria for entering the Idle_Power_Save state according to an embodiment of the present invention.

The flow diagram of FIG. 2 illustrates the steps performed by the UE in the idle mode to determine the criteria for entering the Idle_Power_Save state. FIG. 2 is a detailed description of the Check_Entrance_for_Idle_Power_Save( ) process of step 125 of FIG. 1, which is used to determine when the UE must stop the neighboring cell measurement. In step 205, RANK of serving cell ($R_s$) as determined by the UE in step 120 of FIG. 1 is compared with a pre-defined absolute threshold value of Stop_Measurement_Absolute_Threshold. As used herein, the absolute threshold value (Stop_Measurement_Absolute_Threshold) refers to the minimum threshold value of $R_s$ needed by the UE to maintain the Idle_Power_Save state. If $R_s$ is found to be below the absolute threshold value, the UE goes back into the idle mode in step 210. If $R_s$ is found to be above the absolute threshold value, the order of the RANKs of the neighbor cells ($R_n$) for a predefined number of DRX cycles are examined in step 215.

If the ranking order of the RANKs of the neighbor cells is found to be the same for the predefined number of DRX cycles, the UE enters into the Idle_Power_Save state in step 220. If the ranking order is not the same for the predefined number of DRX cycles, the UE enters into the idle mode in step 210. Accordingly, if the ranking order is the same, the UE sets a 'Return_Entrance' parameter to 1, which is a parameter for using the result of the Check_Entrance_for_Idle_Power_Save( ) process. If the ranking order is not the same, 'Return_Entrance' is set to 0.

Figure 3:
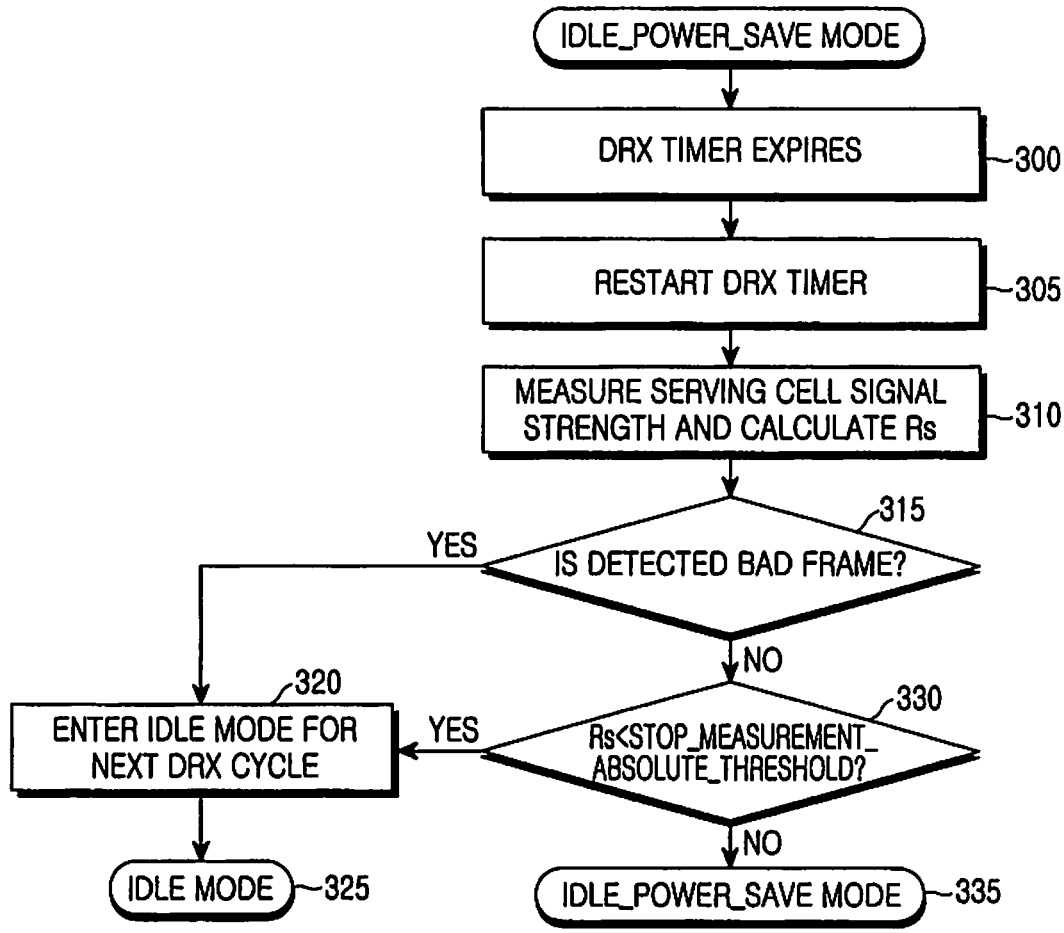
FIG. 3 is a flow diagram illustrating the UE operation wherein the UE is already in the Idle_Power_Save sate during a particular DRX cycle according to an embodiment of the present invention.

The flow diagram of FIG. 3 illustrates the UE operation wherein the UE is already in the Idle_Power_Save state during a particular DRX cycle. When the UE is in the Idle_Power_Save state and the DRX timer expires in step 300, the timer is restarted in step 305. The UE then measures serving cell signal strength and calculates $R_s$ in step 310.

The UE determines if a Bad Frame Indicator (BFI) is detected in step 315. If a BFI is detected, the UE enters into the idle mode for a next DRX cycle in step 320 and operates in the idle mode in step 325. If the UE does not detect a bad frame, it determines if $R_s$ is less than the absolute threshold value of Stop_Measurement_Absolute_Threshold in step 330. If $R_s$ is found to be less than the absolute threshold value, the UE enters the idle mode for a next DRX cycle in step 320. If it is not found to be less than the absolute threshold value, the UE continues to operate in the Idle_Power_Save state in step 335.

Rank is chosen as main criteria for the purpose of optimizing the neighbor cell measurement when the UE is in the idle mode because in a 2G system, the UE always performs serving and neighbor cell measurements, even if the UE is in a favorable area, where measurements can be avoided for some time. The network uses various Hysteresis and Cell Individual Offsets for RANK calculation. These parameters, along with real measured Received signal Level (RX_LEV) values, i.e. RSSI signals measured based on dBm, and final calculated RANKs, provide a more practical insight regarding the neighboring environment of a cell or the network topology. Moreover, when RANK is used as a criteria for optimizing neighbor cell measurements, the UE has a Base Station Identify Code (BSIC) verified neighbor cell list, and thus the decision of optimizing the neighbor cell measurements can better be concluded using RANKs For example, while a measured RX_LEV value of a serving cell may vary greatly, $R_s$ will not change until a measured value crosses Hysteresis values. Similarly measured RX_LEV values of neighbor cells may vary greatly, however $R_n$ will not change, until a change becomes more than Cell Individual values. RX_LEV based methods do not provide a true estimate of exact Network Topology which is obtainable by using RANK, which takes into account all the available parameters including Cell Individual Offset, Hysteresis, status of BSIC verification, etc.

The neighbor cell measurement methods as described herein are applicable to a UE in a 2G/2.5G or a 3G network when the UE is in an idle mode. The methods of determining the neighbor cell measurements using RANKs of the UE in the idle mode can be adapted to the above mentioned networks by meeting the various requirements as may be prescribed by the appropriate standards.

According to the embodiments of the present invention, a UE in the idle mode performs fewer measurements in cases where Network topology is not changing fast, thus reducing power consumption. In addition, the UE performs fewer cell reselections and hence un-necessary Routing Area Updates (RAUs)/Location Area Updates (LAUS) are avoided.

It will be obvious to those skilled in the art that other control methods and apparatuses can be derived from the combinations of the various methods and apparatuses of the embodiments of the present invention as taught by the description and the accompanying drawings, and these shall also be considered within the scope of the present invention. It should also be noted that the host for storing the applications includes, but is not limited to, a microchip, microprocessor, and handheld communication device.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of reducing power consumption in a User Equipment (UE) in an idle mode, the method comprising:
    acquiring RANKS of a serving cell and one or more neighbor cells by the UE connected to a mobile communication network;
    determining a rate of performing neighbor cell measurement based on the RANKs acquired by the UE; and
    performing neighbor cell measurement at the determined rate.

2. The method of claim 1 wherein RANKs of the serving cell and the one or more neighbor cells of the UE are determined using at least one of Hysteresis, Cell Individual Offsets and Received signal Level (RX_LEV) values of the UE when the UE is in the idle mode.

3. The method of claim 1, wherein the RANK of the serving cell is compared with a predefined Threshold Value to determine whether to perform neighbor cell measurement by the UE.

4. The method of claim 3, further comprising examining an Order of RANKs of the one or more neighbor cells for a predefined number of Discontinuous Reception (DRX) cycles by the UE, when the RANK of the serving cell is higher than the predefined Threshold Value.

5. The method of claim 4, wherein the UE abstains from neighbor cell measurement when the Order of RANKs of the neighbor cells remains unaltered for the predefined number of DRX cycles.

6. The method of claim 3, wherein the UE continues to perform normal neighbor cell measurement function when the RANK of the serving cell is below the predefined Threshold Value.

7. The method of claim 5, wherein the UE continues to abstain from measuring neighbor cells in every DRX cycle until the UE encounters a Bad Frame.

8. The method of claim 5, wherein the UE continues to abstain from measuring neighbor cells in every DRX cycle until the RANK of the serving cell drops below the predefined Threshold Value.

9. The method of claim 1, wherein the mobile communication network includes a 2G, 2.5G, or 3G network.

* * * * *